(12) United States Patent
Ke

(10) Patent No.: US 7,830,626 B2
(45) Date of Patent: Nov. 9, 2010

(54) RESILIENT PLATE AND LENS ACTUATOR WITH SAME

(75) Inventor: Chau-Yuan Ke, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 198 days.

(21) Appl. No.: 12/192,376

(22) Filed: Aug. 15, 2008

(65) Prior Publication Data

US 2009/0237819 A1 Sep. 24, 2009

(30) Foreign Application Priority Data

Mar. 24, 2008 (CN) .................. 2008 1 0300684

(51) Int. Cl.
*G02B 7/02* (2006.01)

(52) U.S. Cl. ...................... 359/819; 359/824
(58) Field of Classification Search ................. 359/819, 359/824

See application file for complete search history.

(56) References Cited

U.S. PATENT DOCUMENTS

2004/0017620 A1* 1/2004 Kaneko et al. .............. 359/824
2008/0186601 A1* 8/2008 Honma ....................... 359/824
2009/0290233 A1* 11/2009 Chou ......................... 359/696
2009/0304989 A1* 12/2009 Ke ............................. 428/131

* cited by examiner

*Primary Examiner*—Ricky L Mack
*Assistant Examiner*—James C Jones
(74) *Attorney, Agent, or Firm*—Andrew C. Cheng

(57) ABSTRACT

A resilient plate includes a plate shaped body. A through hole is defined in the center of the plate shaped body. A plurality of slots is defined in the plate shaped body and the slots cooperatively surrounding the through hole. Each of the slots includes a first substantially straight slot portion, a second substantially straight slot portion and a third substantially straight slot portion. The second substantially straight slot portion interconnects between and substantially perpendicular to the first and second substantially straight slot portions. The slots are oriented about 90 degrees with respect to each other. The resilient plate further includes a plurality of pinholes defined in the periphery portion of the plate shaped body. The bracket includes a plurality of first positioning pins corresponding to the pinholes. The resilient plate is fastened to the bracket by engagement of the pinholes with the respective first positioning pins.

15 Claims, 5 Drawing Sheets

US 7,830,626 B2

RESILIENT PLATE AND LENS ACTUATOR WITH SAME

BACKGROUND

1. Technical Field

The present invention relates to lens actuators, and particularly, to a voice coil motor type lens actuator and a resilient plate in the actuator.

2. Description of related art

Variable focal length lenses are widely used in optical systems. Optical systems incorporating such lenses can, for example, provide focused images of objects at varying distances without adjusting the distance between the lens and the image plane. Variable focal length lenses can also be used in optical systems that provide varying magnification without change of lenses.

Generally, the optical system usually includes an actuator, such as a step motor, to drive the lenses. However, the step motor is relatively large in volume. Use of the step motor requires a significant amount of space for movement of the lenses, which makes the optical system bulky.

Therefore, what is needed is a lens actuator adapted for driving the lenses with more compact structure and less mechanical movement.

SUMMARY

A resilient plate includes a plate shaped body. A through hole is defined in the center of the plate shaped body. A plurality of slots is defined in the plate shaped body and the slots cooperatively surrounding the through hole. Each of the slots includes a first substantially straight slot portion, a second substantially straight slot portion and a third substantially straight slot portion. The second substantially straight slot portion interconnects between and substantially perpendicular to the first and second substantially straight slot portions. The slots are oriented about 90 degrees with respect to each other.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Figure 1:
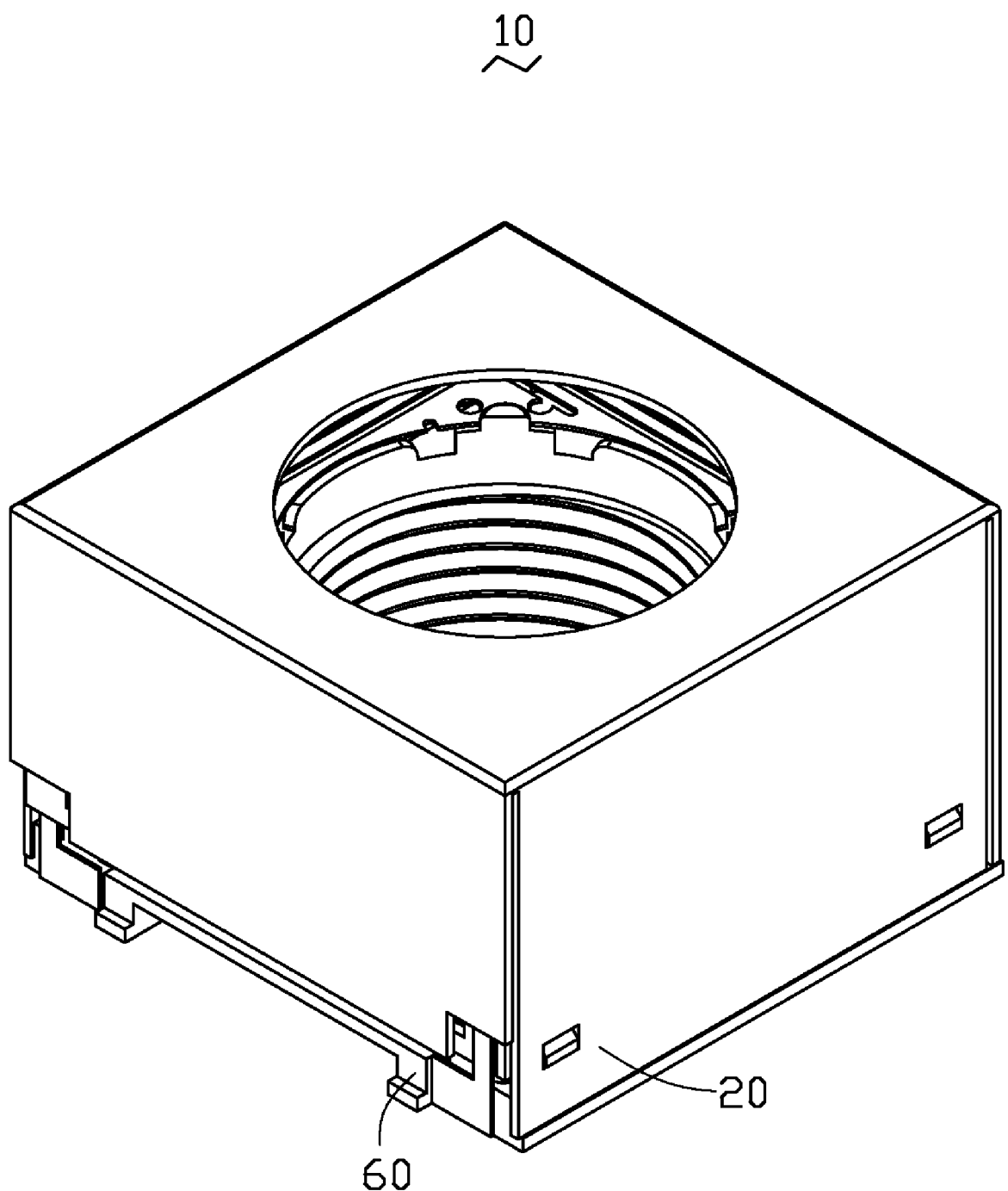
FIG. 1 is a schematic, isometric view of a lens actuator according to a present embodiment of the present invention, the lens actuator includes a bracket, a movable unit, and a resilient plate.
Figure 2:
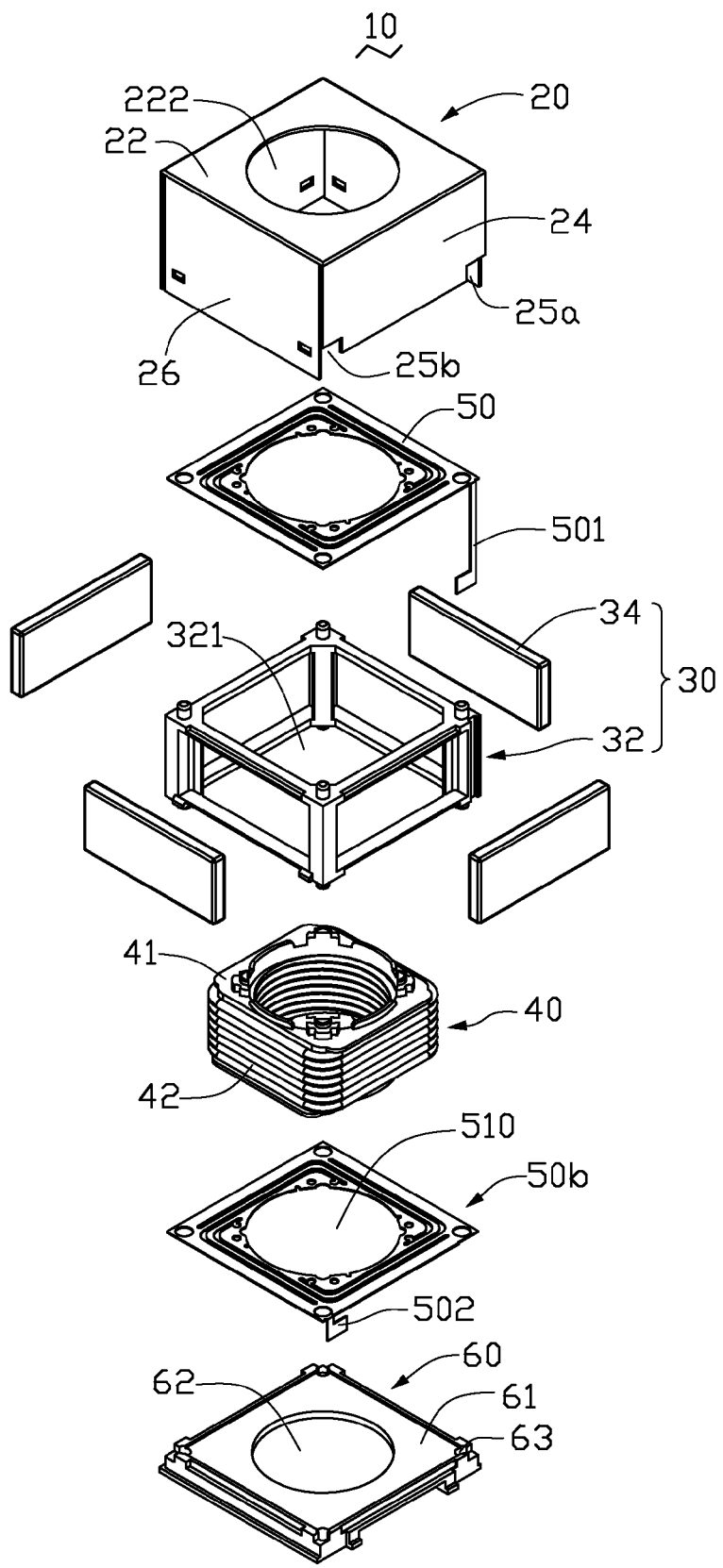
FIG. 2 is an exploded view of the lens actuator in FIG. 1.

Referring to FIGS. 1 and 2, a lens actuator 10, in accordance with a present embodiment, includes a housing 20, a fixed unit 30, a movable unit 40, two resilient plates (50, 50a), and a board 60.

The housing 20 includes a panel 22, a through hole 222 defined in the center of the panel 22, two opposite first peripheral panels 24 and two opposite second peripheral panels 26 respectively perpendicularly extending from the four peripheral sides of the panel 22 and fastened to one another by a dovetail panel joint (not shown), and two terminal slot 25a, 25b on one of the first peripheral panels 24. The panel 22, the first peripheral panels 24, and the second peripheral panels 26 cooperatively define a cavity for accommodating the fixed unit 30. A material of the housing 20 is an electromagnetic shield material, such as nick alloy, conductive plastic, surface conductive material, conductive glass, etc.

Figure 3:
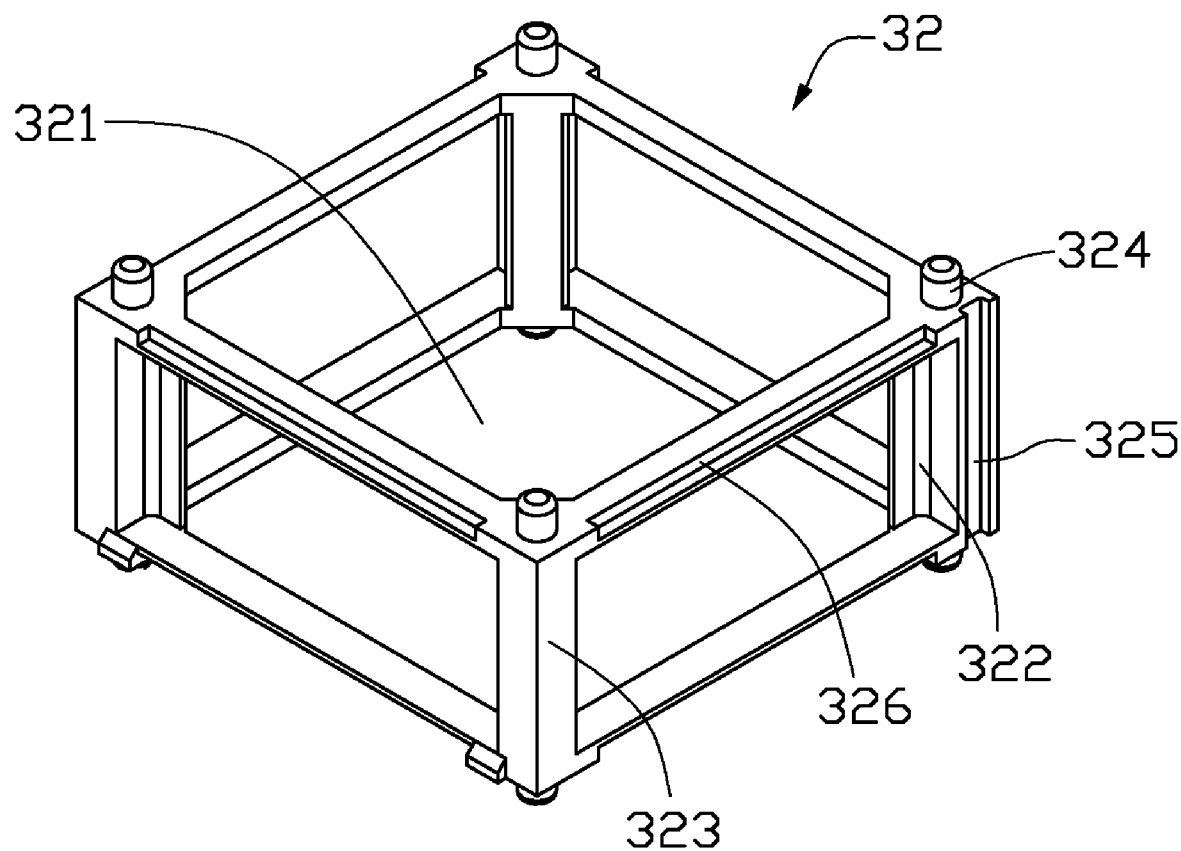
FIG. 3 is a schematic, isometric view of the bracket in FIG. 2.

The fixed unit 30 includes a cubic bracket 32 and a plurality of magnets 34. The bracket 32 includes a frame body 323 (refer to FIG. 3) receivable in the housing 20. A first accommodation room 321 is defined in the frame body 323. Four magnet mounting holes 322 are respectively formed in four sides of the frame body 323. The magnet mounting holes 322 are in communication with the first accommodation room 321. A plurality of first gluing grooves 326 is defined in the frame body 323. The first gluing grooves 326 are configured for receiving an amount of the adhesive used for adhering the magnets 34 to the cubic bracket 32, and preventing it from infiltrating into the bracket 32 or at least greatly reducing the chance thereof to occur. A terminal groove 325 is formed on one side of the frame body 323. Four first locating pins 324 respectively protrude vertically from the top and bottom sides of the frame body 21 at each corner thereof. The first locating pins 324 are configured for fastening the fixed unit 30 to one of the resilient plates (50, 50a). The number of the magnets 34 corresponds to that of the magnet mounting holes 322. The magnets 34 are respectively mounted in the magnet mounting holes 322.

Figure 4:
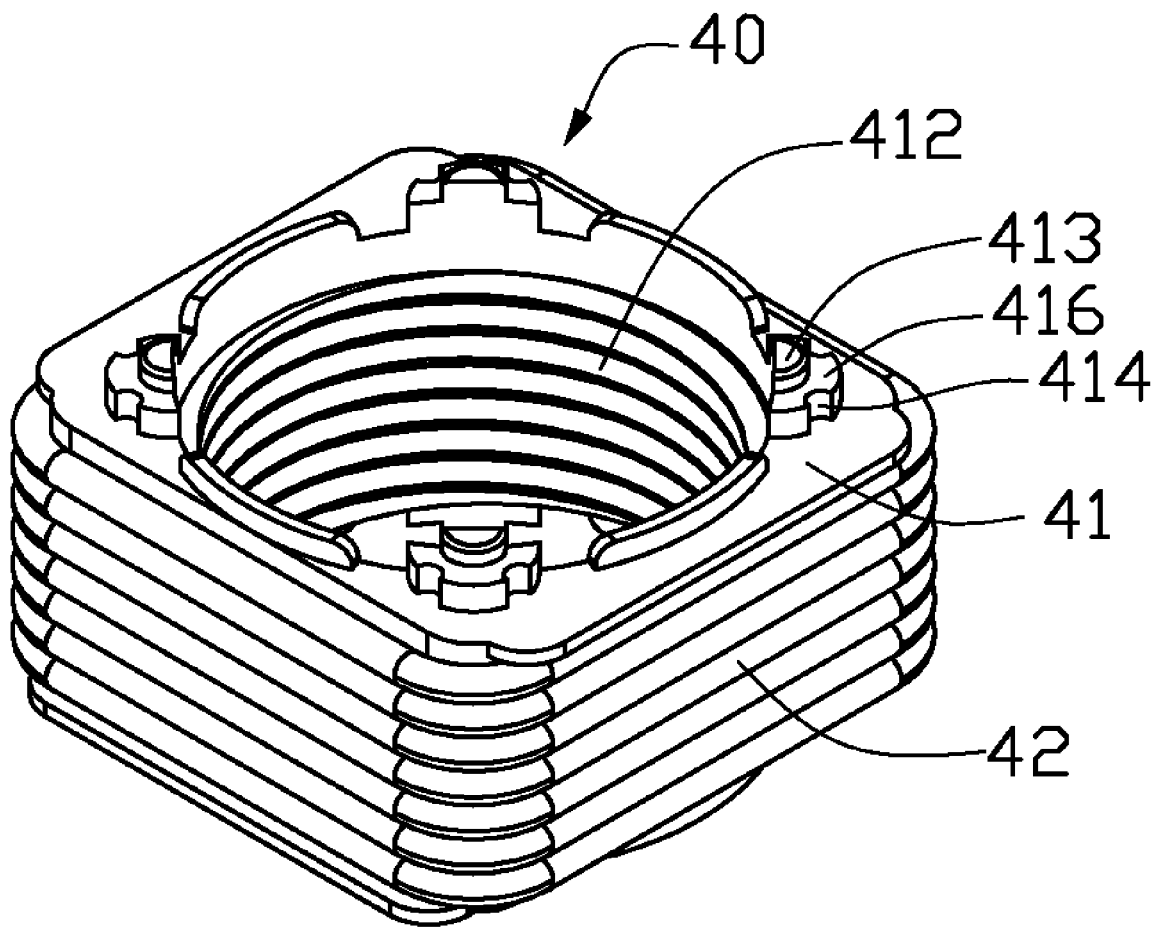
FIG. 4 is a schematic, isometric view of the movable unit in FIG. 2.

Referring to FIG. 4, the movable unit 40 includes a lens barrel 41 and coils 42. The movable unit 40 is accommodated in the first accommodating room 321 of the bracket 32. The lens barrel 41 defines a second accommodating room 412 for accommodating the lenses and filters (not shown). The second accommodating room 412 is a through hole. Four convex stages 416 respectively protrude from the top and bottom sides of the lens barrel 40 at each corner thereof. A second locating pin 413 protrudes from the top surface of the each of the convex stage 416. Two grooves 414 are defined on the outer sidewall of each convex stage 416. The grooves 414 are configured for receiving an adhesive material therein. The two resilient plate (50, 50a) are respectively glued (i.e., adhesively mounted) to the top and bottom sides of the lens barrel 41 by adhesive, so as to prevent the lenses or the filters from falling out of the lens barrel 41. The coils 42 are wrapped around the side wall of the lens barrel 41.

Figure 5:
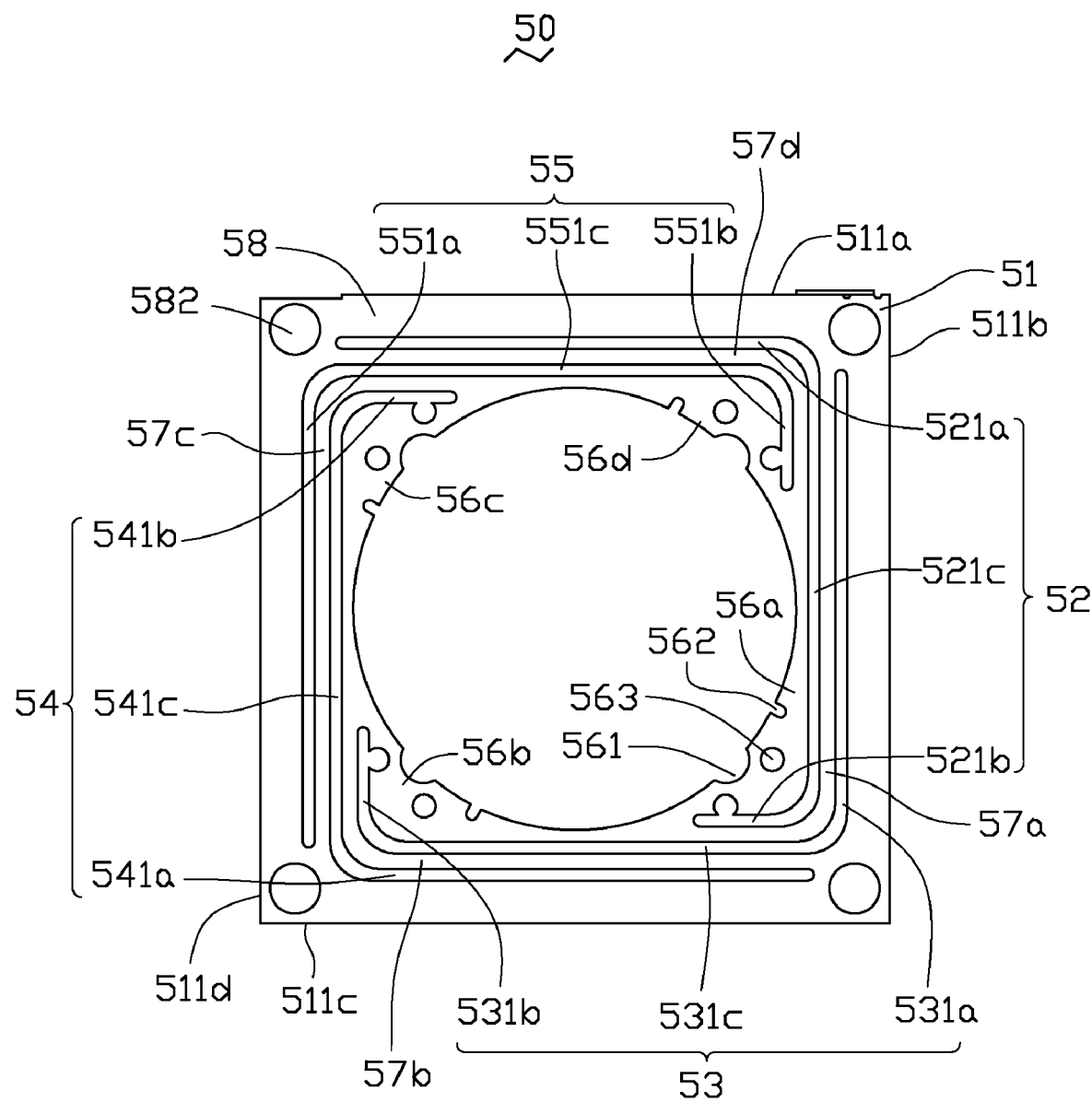
FIG. 5 is a schematic, isometric view of the resilient plate in FIG. 2.

Referring to FIG. 5, the first resilient plate 50 includes a plate shaped body 51. In the present embodiment, the plate shaped body 51 is square shaped. The plate shaped body 51 includes a first edge 511a, a second edge 511b, a third edge 511c, and a fourth edge 511d. The first edge 511a is parallel to the third edge 511c, and the second edge 511b is parallel to the fourth edge 511d. A second through hole 510 for light passing therethrough is defined at the center of the plate shaped body 51. A first slot 52, a second slot 53, a third slot 54 and a fourth slot 55 are defined in the plate shaped body 51 around the second through hole 510. The slots (52, 53, 54, 55) are oriented about 90 degrees with respect to each other.

The first slot 52 includes a first starting portion 521a, a first ending portion 521b, and a first connecting portion 521c. The first starting portion 521a is parallel to the first edge 511a. The first ending portion 521b is parallel to the third edge 511c. The first connecting portion 521c is parallel to the second edge 511b and connected with the first starting portion 521a and the first ending portion 521b. The length of the first ending portion 521b is less than or equal to that of the first starting portion 521a. A first fixing portion 56a is formed between the second through hole 510 and the angular part or space between the first ending portion 521b and the first connecting portion 521c.

The second slot 53 includes a second starting portion 531a, a second ending portion 531b, and a second connecting portion 531c. The second starting portion 531a is parallel to the second edge 511b. The second ending portion 531b is parallel to the fourth edge 511d. The second connecting portion 531c is parallel to the third edge 511c and connected with the second starting portion 531a and the second ending portion 531b. The length of the second ending portion 531b is less than or equal to that of the second starting portion 531a. A second fixing portion 56b is formed between the second through hole 510 and the angular part or space between the second ending portion 531b and the second connecting portion 531c. The second starting portion 531a and the second connecting portion 531c are on the outer side of the first slot 52, i.e., the second starting portion 531a and the second connecting portion 531c are closer to the second edge 511b and the third edge 511c than the first slot 52. A first L-shaped resilient portion 57a is arranged between the first slot 52 and the second slot 53. The resilient portion 57a has a uniform width throughout the length thereof. Since the L-shaped resilient portion 57a has an angular part or space, the durability and flexibility of the first resilient plate 50 is enhanced.

The third slot 54 includes a third starting portion 541a, a third ending portion 541b, and a third connecting portion 541c. The third starting portion 541a is parallel to the third edge 511c. The third ending portion 541b is parallel to the first edge 511a. The third connecting portion 541c is parallel to the fourth edge 511d and connected with the third starting portion 541a and the third ending portion 541b. The length of the third ending portion 541b is less than or equal to that of the third starting portion 541a. A third fixing portion 56c is formed between the second through hole 510 and the angular part or space between the third ending portion 541b and the third connecting portion 541c. The third starting portion 541a and the third connecting portion 541c are on the outer side of the second slot 53, i.e., the third starting portion 541a and the third connecting portion 541c are closer to the third edge 511c and the fourth edge 511d than the second slot 53. A second L-shaped resilient portion 57b is formed between the second slot 53 and the third slot 54.

The fourth slot 55 includes a fourth starting portion 551a, a fourth ending portion 551b, and a fourth connecting portion 551c. The fourth starting portion 551a is parallel to the fourth edge 511d. The fourth ending portion 551b is parallel to the second edge 511b. The fourth connecting portion 551c is parallel to the first edge 511a and connected with the fourth starting portion 551a and the fourth ending portion 551b. The length of the fourth ending portion 551b is less than or equal to that of the fourth starting portion 551a. A fourth fixing portion 56d is formed between the second through hole 510 and the angular part or space between the fourth ending portion 551b and the fourth connecting portion 551c. The fourth starting portion 551a and the fourth connecting portion 551c are on the outer side of the third slot 54, i.e., the fourth starting portion 551a and the fourth connecting portion 551c are closer to the fourth edge 511d and the first edge 511a than the third slot 54. A third L-shaped resilient portion 57c is formed between the third slot 54 and the fourth slot 55. The first starting portion 521a and the first connecting portion 521c are on the outer side of the fourth slot 55, i.e., the first starting portion 521a and the first connecting portion 521c are closer to the first edge 511d and the first edge 511a than the fourth slot 55. A fourth L-shaped resilient portion 57d is formed between the fourth slot 55 and the first slot 52.

Each fixing portion (56a, 56b, 56c, 56d) defines a first cutout 561 in the edge of the second through hole 510 corresponding to the respective second locating pins 413. Each fixing portion (56a, 56b, 56c, 56d) further defines two holes 563 set around the first cutout 561. The two holes 563 are corresponding to the grooves 414. The fixing portion (56a, 56b, 56c, 56d) further defines a second cutout 562 around the second through hole 510 for fixing one end of the coils 42 therein.

A periphery portion 58 is formed between the edges (511a, 511b, 511c and 511d) and the starting portions (521a, 531a, 541a and 551a). Four holes 582 corresponding to the respective first locating pins 324 are defined in the periphery portion 58 in four corners. The first resilient plate 50 is fastened to the bottom side of the bracket 32 by engagement of the holes 582 with the respective first locating pins 324.

Most of the structure of the second resilient plate 50a is similar to that of the first resilient plate 50, except that, the first resilient plate 50 includes a first terminal 501 perpendicular to one side thereof and the second resilient plate 50a includes a second terminal 502 perpendicular to one side thereof.

The board 60 includes a body 61 covered over the second resilient plate 50a on the top side of the housing 30, a through hole 62 corresponding to the second accommodating room 412 of the lens barrel 41, four holes 63 respectively fastened to the first locating pins 324 at the top side of the bracket 32.

The first terminal 501 is mounted in the terminal groove 325 of the bracket 32 and electrically connected to the coils 42. The second terminal 502 is electrically connected to the coils 42.

When an electric current is applied to the terminals 501, 502 and the coils 42, the coils 42 are excited to act upon the magnets 34, thereby producing a magnetic force to drive the lens barrel 42 to move between the first resilient plate 50 and the second resilient plate 50a.

When electric current is cut off from the terminals 501, 502, the first resilient plate 50 and the second resilient plate 50a impart a pressure to the lens barrel 41 relative to the bracket 32, thereby returning the lens barrel 41 to its former position.

Further, the housing 20 and the board 60 protect the lens barrel and image sensor (not shown) against dust.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A lens actuator comprising:
a lens barrel for accommodating the lens, a coil wrapped around the lens barrel, a plurality of magnets, a bracket for mounting the magnets thereon and accommodating the lens barrel therein, and a resilient plate connected between the bracket and the lens barrel to hold the lens barrel on the bracket,
wherein the resilient plate comprises a plate shaped body, a through hole defined in the center of the plate shaped body, a plurality of slots defined in the plate shaped body and, the slots cooperatively surrounding the through hole, wherein each of the slots includes a first substantially straight slot portion, a second substantially straight slot portion and a third substantially straight slot portion, the second substantially straight slot portion interconnect between and substantially perpendicular to the first and second substantially straight slot portions, the slots being oriented about 90 degrees with respect to each other, wherein the resilient plate further comprises a plurality of pinholes defined in the periphery portion of the plate shaped body, the bracket comprises a plurality of first positioning pins corresponding to the pinholes and protruded out from the bracket, and the resilient plate is fastened to the bracket by engagement of the pinholes with the respective first positioning pins.

2. A lens actuator comprising:

a lens barrel for accommodating the lens, a coil wrapped around the lens barrel, a plurality of magnets, a bracket for mounting the magnets thereon and accommodating the lens barrel therein, and a resilient plate connected between the bracket and the lens barrel to hold the lens barrel on the bracket, wherein the resilient plate comprises a plate shaped body, a through hole defined in the center of the plate shaped body, a plurality of slots defined in the plate shaped body and, the slots cooperatively surrounding the through hole, wherein each of the slots includes a first substantially straight slot portion, a second substantially straight slot portion and a third substantially straight slot portion, the second substantially straight slot portion interconnect between and substantially perpendicular to the first and second substantially straight slot portions, the slots being oriented about 90 degrees with respect to each other, wherein the plate shaped body is substantially a square plate, wherein the plate shaped body includes a first edge, a second edge, a third edge, and a fourth edge, the first edge is substantially parallel to the third edge, and the second edge is substantially parallel to the fourth edge, wherein the plate shaped body includes a plurality of L-shaped resilient portions, each L-shaped resilient portion arranged between two neighboring slots, wherein a length of the third substantially straight slot portion of each slot is less than or equal to a length of the first substantially straight slot portion, wherein the plate shaped body comprises a plurality of fixing portions, each of the fixing portions is located between the through hole and the junction portion of the second and third substantially straight slot portions of the corresponding slot, wherein the resilient plate further comprises a plurality of first cutouts defined in the edge of the through hole corresponding to the respective fixing portions, the lens barrel comprises a plurality of second positioning pins corresponding to the first cutouts and protruded out from the lens barrel, and the resilient plate is fastened to the lens barrel by engagement of the first cutouts with the respective second positioning pins.

3. The lens actuator as claimed in claim 2, wherein the lens barrel comprises a convex stage protruded out therefrom and two grooves defined in the outer sidewall of the convex stage configured for receiving an amount of an adhesive, and the second positioning pin is protruded from the top surface of the corresponding convex stage.

4. The lens actuator as claimed in claim 2, wherein the resilient plate further comprises a plurality of second cutouts defined in the edge of the through hole and each of the second cutouts is arranged next to the respective first cutouts, and the second cutouts are configured for fixing one end of the coil therein.

5. The lens actuator as claimed in claim 3, wherein the resilient plate further comprises pairs of holes, each pair of the holes are defined in each of the fixing portions and arranged next to the respective first cutouts, and the holes are configured for receiving an amount of an adhesive.

6. The lens actuator as claimed in claim 1, wherein the plate shaped body is substantially a square plate.

7. The lens actuator as claimed in claim 2, wherein the plate shaped body includes a first edge, a second edge, a third edge, and a fourth edge, the first edge is substantially parallel to the third edge, and the second edge is substantially parallel to the fourth edge.

8. The lens actuator as claimed in claim 3, wherein the plate shaped body includes a plurality of L-shaped resilient portions, each L-shaped resilient portion arranged between two neighboring slots.

9. The lens actuator as claimed in claim 4, wherein a length of the third substantially straight slot portion of each slot is less than or equal to a length of the first substantially straight slot portion.

10. The lens actuator as claimed in claim 5, wherein the plate shaped body comprises a plurality of fixing portions, each of the fixing portions is located between the through hole and the junction portion of the second and third substantially straight slot portions of the corresponding slot.

11. The lens actuator as claimed in claim 4, wherein the plurality of the slots comprises a first slot, a second slot, a third slot, and a fourth slot, the first substantially straight portion of the first slot is substantially parallel to the first edge, the second substantially straight portion of the first slot is substantially parallel to the second edge, the first substantially straight portion of the second slot is substantially parallel to the second edge, the second substantially straight portion of the second slot is substantially parallel to the third edge, the first substantially straight portion of the third slot is substantially parallel to the third edge, the second substantially straight portion of the third slot is substantially parallel to the fourth edge, the first substantially straight portion of the fourth slot is substantially parallel to the fourth edge, and the second substantially straight portion of the third slot is substantially parallel to the first edge.

12. The lens actuator as claimed in claim 6, wherein the resilient plate further comprises a plurality of first cutouts defined in the edge of the through hole corresponding to the respective fixing portions, the lens barrel comprises a plurality of second positioning pins corresponding to the first cutouts and protruded out from the lens barrel, and the resilient plate is fastened to the lens barrel by engagement of the first cutouts with the respective second positioning pins.

13. The lens actuator as claimed in claim 12, wherein the lens barrel comprises a convex stage protruded out therefrom and two grooves defined in the outer sidewall of the convex stage configured for receiving an amount of an adhesive, and the second positioning pin is protruded from the top surface of the corresponding convex stage.

14. The lens actuator as claimed in claim 12, wherein the resilient plate further comprises a plurality of second cutouts defined in the edge of the through hole and each of the second cutouts is arranged next to the respective first cutouts, and the second cutouts are configured for fixing one end of the coil therein.

15. The lens actuator as claimed in claim 13, wherein the resilient plate further comprises pairs of holes, each pair of the holes are defined in each of the fixing portions and arranged next to the respective first cutouts, and the holes are configured for receiving an amount of an adhesive.

* * * * *